United States Patent
Sasaki et al.

(10) Patent No.: US 10,735,626 B2
(45) Date of Patent: Aug. 4, 2020

(54) INFORMATION PROCESSING APPARATUS, COMPUTER READABLE MEDIUM AND INFORMATION PROCESSING METHOD

(71) Applicant: FUJI XEROX CO., LTD., Tokyo (JP)

(72) Inventors: Shigehiko Sasaki, Yokohama (JP); Nobuhisa Takagi, Yokohama (JP); Yasushi Sano, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/432,129

(22) Filed: Jun. 5, 2019

(65) Prior Publication Data
US 2019/0289170 A1   Sep. 19, 2019

Related U.S. Application Data

(63) Continuation of application No. 14/987,243, filed on Jan. 4, 2016, now Pat. No. 10,367,972.

(30) Foreign Application Priority Data

Sep. 25, 2015   (JP) ................................. 2015-188448

(51) Int. Cl.
*H04W 4/80*   (2018.01)
*H04N 1/00*   (2006.01)
(Continued)

(52) U.S. Cl.
CPC ........... *H04N 1/4413* (2013.01); *G06F 3/021* (2013.01); *G06F 21/608* (2013.01); *G06F 21/629* (2013.01); *H04N 1/00204* (2013.01); *H04N 1/00795* (2013.01); *H04W 4/80* (2018.02); *H04N 2201/0094* (2013.01)

(58) Field of Classification Search
CPC ....................................................... H04W 4/008
See application file for complete search history.

(56) References Cited

U.S. PATENT DOCUMENTS 8,264,706 B2   9/2012   Sato
2008/0084576 A1*   4/2008   Dantwala ........... H04N 1/00204
358/1.15
(Continued)

FOREIGN PATENT DOCUMENTS

CN   101600034 A   12/2009
CN   104008318 A   8/2014
(Continued)

OTHER PUBLICATIONS

Jan. 18, 2017 Office Action Issued in U.S. Appl. No. 14/987,243.
(Continued)

*Primary Examiner* — King Y Poon
(74) *Attorney, Agent, or Firm* — Oliff PLC

(57) ABSTRACT

An information processing apparatus includes: a first control unit which controls a reading device for reading an image from a document so that an image reading manipulation for the reading device is made through a first input device, when a document is set in the reading device; and a second control unit which controls the reading device so that an image reading manipulation for the reading device is made through a second input device, in case a particular manipulation is made after a start of the control by the first control unit.

6 Claims, 7 Drawing Sheets

(51) Int. Cl.
*H04N 1/44* (2006.01)
*G06F 21/60* (2013.01)
*G06F 21/62* (2013.01)
*G06F 3/02* (2006.01)

(56) References Cited

U.S. PATENT DOCUMENTS

| | | |
|---|---|---|
| 2009/0190163 A1 | 7/2009 | Sato |
| 2009/0303551 A1 | 12/2009 | Okada |
| 2011/0292474 A1 | 12/2011 | Wakaura |
| 2011/0302642 A1 | 12/2011 | Tanaka |
| 2013/0201530 A1 | 8/2013 | Kajita et al. |
| 2014/0245413 A1 | 8/2014 | Yasui |
| 2015/0156343 A1 | 6/2015 | Tsujii |
| 2015/0161066 A1 | 6/2015 | Matsuda |
| 2016/0044199 A1 | 2/2016 | Nago |
| 2016/0124686 A1* | 5/2016 | Maeda .................. G06F 3/1204 358/1.14 |
| 2017/0034247 A1 | 2/2017 | Tredoux |

FOREIGN PATENT DOCUMENTS

| | | |
|---|---|---|
| JP | 2009177547 A | 8/2009 |
| JP | 2009232113 A | 10/2009 |
| JP | 2009267701 A | 11/2009 |
| JP | 2014-011620 A | 1/2014 |

OTHER PUBLICATIONS

Jan. 20, 2017 Search Report issued in European patent application No. 16150368.5-1870.
Jan. 9, 2018 Office Action issued in U.S. Appl. No. 14/987,243.
Aug. 27, 2018 Office Action Issued in U.S. Appl. No. 14/987,243.
Apr. 28, 2019 Office Action issued in Chinese Patent Application No. 201610089973.6.
May 21, 2019 Office Action issued in Japanese Patent Application No. 2015-188448.

* cited by examiner

INFORMATION PROCESSING APPARATUS, COMPUTER READABLE MEDIUM AND INFORMATION PROCESSING METHOD

CROSS-REFERENCE TO RELATED APPLICATIONS

This application is a continuation of U.S. patent application Ser. No. 14/987,243 filed on Jan. 4, 2016, which claims the benefit of Japanese Patent Application No. 2015-188448 filed on Sep. 25, 2015. The disclosure of each of the prior applications is incorporated herein by reference in their entirety.

BACKGROUND

1. Technical Field

The present invention relates to an information processing apparatus, a computer readable medium and an information processing method.

2. Related Art

A technique is known which prevents a reading device (for reading an image from a document) from accepting a manipulation of another user when a user is going to have the reading device read an image of a document that has been set therein by the user.

SUMMARY

According to an aspect of the invention, there is provided an information processing apparatus comprising: a first control unit which controls a reading device for reading an image from a document so that an image reading manipulation for the reading device is made through a first input device, when a document is set in the reading device; and a second control unit which controls the reading device so that an image reading manipulation for the reading device is made through a second input device, in case a particular manipulation is made after a start of the control by the first control unit.

DESCRIPTION OF SYMBOLS

1 . . . Information processing system; 2 . . . Communication lines; 3 . . . Communication device; 4 . . . Manipulation terminal; 10 . . . Information processing apparatus; 20 . . . User terminal; 30 . . . Operation panel; 11, 21, 31 . . . Control unit; 12, 22, 32 . . . Storage unit; 13 . . . Image reading unit; 14 . . . Image forming unit; 15 . . . First communication unit; 16 . . . Second communication unit; 17 . . . Connection unit; 23, 33 . . . Communication unit; 24, 34 . . . Display unit; 25, 35 . . . Manipulation unit; 26, 36 . . . Short-range communication unit; 221 . . . Manipulation image managing unit; 222 . . . Manipulation image DB; 223 . . . Function unit; 224 . . . Acceptance responding unit; 225 . . . Event notification unit; 226 . . . Authentication right managing unit; 230 . . . Middleware layer; 240 . . . Hardware layer; 701 . . . User session managing unit; 702 . . . UI session managing unit; 703 . . . Session correlating/canceling unit; 704 . . . Manipulation status managing unit; 705 . . . Session information storage unit.

DETAILED DESCRIPTION

[1] Embodiment

Figure 1:
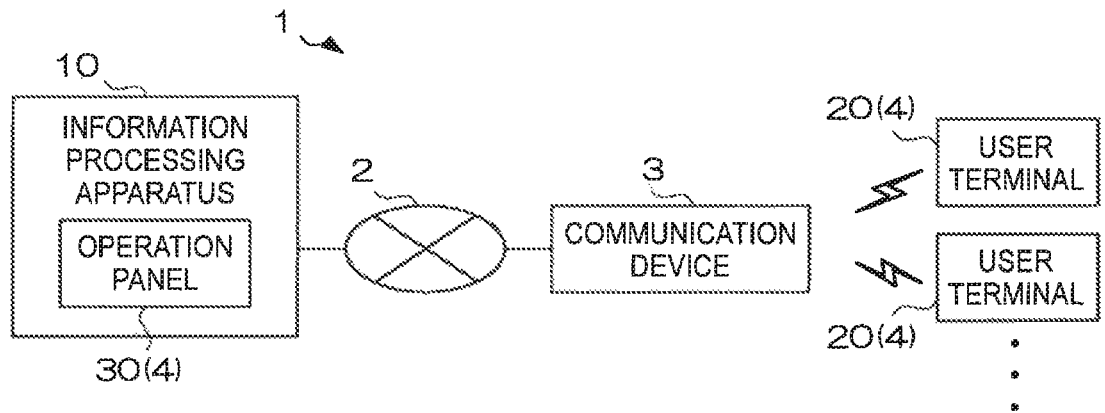
FIG. 1 shows an overall configuration of an information processing system according to an embodiment.

FIG. 1 shows an overall configuration of an information processing system 1 according to an embodiment. The information processing system 1 consists of communication lines 2, a communication device 3, an information processing apparatus 10, and plural user terminals 20. In the embodiment, the information processing system 1 provides users with various functions such as copying, scanning, fax (facsimile), and printing (i.e., output of image data to a medium).

Being the Internet, a mobile communication network, or telephone lines, or the like, the communication lines 2 transmit a communication that is made between apparatus or devices connected to itself. The communication lines 2 are typically a wired LAN (local area network) and are connected to the information processing apparatus 10 and the communication device 3. Being a device having a communication function, in the embodiment the communication device 3 has a function of interfacing between a wireless communication and the wired LAN according to a wireless LAN standard. For example, the communication device 3 is what is called a wireless access point device. Whereas the communication device 3 performs a wireless communication with a user terminal 20, it communicates with the information processing apparatus 10 via the communication lines 2. That is, the information processing apparatus 10 communicates with a user terminal 20 via the communication lines 2 and the communication device 3.

An alternative configuration is possible in which the information processing apparatus 10 itself is equipped with the communication device 3 (i.e., the communication lines 2 are not provided) and directly communicates with a user terminal 20. An example connection form of this case is that the communication device 3 of the information processing apparatus 10 communicates with a user terminal 20 according to the Wi-Fi Direct (registered trademark) standard.

The information processing apparatus 10 performs such processing as image formation processing of forming an image on a medium and image reading processing of reading an image that is formed on a medium. Each of these kinds of processing is performed in providing a user with one of the above-mentioned functions, that is, copying, scanning, fax, printing, etc. The information processing apparatus 10 is equipped with an operation panel 30 for manipulation of itself. The operation panel 30 is a user interface of the information processing apparatus 10 and is one of terminals (hereinafter referred to as "manipulation terminals") to be used for manipulation of the information processing apparatus 10.

The user interface means an interface that allows a user to exchange information with a manipulation target apparatus (in the embodiment, information processing apparatus 10). The user manipulates the manipulation target apparatus using a manipulation terminal. The manipulation terminal displays a picture for manipulation by the user or a picture corresponding to a manipulation (e.g., a picture representing a result of the manipulation).

The operation panel 30 is a manipulation terminal that is fixed to the body of the information processing apparatus 10 and serves for manipulation of various units of the information processing apparatus 10. The operation panel 30 is used by a user who has come to the installation place of the information processing apparatus 10. The operation panel 30 may either be fixed to the information processing apparatus 10 or be detachable from the information processing apparatus 10 so as to be used as a tablet terminal.

Being a terminal to be used by a user, each of the user terminals 20 is a smartphone, a tablet terminal, a personal computer, or the like. Each user terminal 20 communicates with the information processing apparatus 10 and thereby exchanges with it data to be used for manipulating it. Each user terminal 20 is one of the manipulation terminals of the information processing apparatus 10. That is, each of the operation panel 30 and the user terminals 20 is a manipulation terminal of the information processing apparatus 10, and in the following description they will be referred to as "manipulation terminals 4" when they are not discriminated from each other.

Figure 2:
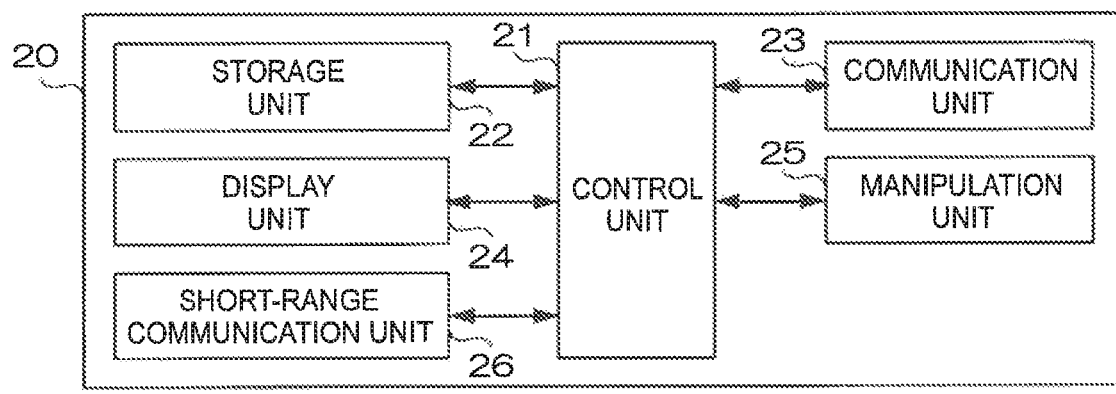
FIG. 2 shows a hardware configuration of each user terminal.

FIG. 2 shows a hardware configuration of each user terminal 20. Each user terminal 20 is a computer that is equipped with a control unit 21, a storage unit 22, a communication unit 23, a display unit 24, a manipulation unit 25, and a short-range communication unit 26. The control unit 21 is equipped with a CPU (central processing unit), a ROM (read-only memory), a RAM (random access memory), and a real-time clock. The CPU runs programs stored in the ROM or the storage unit 22 using the RAM as a work area and thereby controls operations of the individual units. The real-time clock calculates a current date and time and notifies the CPU of it. The storage unit 22 is equipped with a flash memory, for example, and stores data, programs (e.g., applications such as a web browser), image data, etc. to be used by the CPU to perform controls.

The communication unit 23 is equipped with an antenna and a communication circuit for performing a wireless communication according to a wireless LAN standard, and performs a wireless communication with, for example, the communication device 3 shown in FIG. 1. The display unit 24 is equipped with a liquid crystal display, for example, and displays an image on its display screen being controlled by the control unit 21. For example, where the user terminal 20 is a smartphone or a tablet terminal, the manipulation unit 25 is equipped with a touch sensor (also called a touch screen or a touch panel) that is laid on the display screen, buttons provided on the body, and other things. And the manipulation unit 25 receives a user manipulation such as a tap and supplies the control unit 21 with manipulation data indicating the content of the user manipulation. Where the user terminal 20 is a personal computer, the manipulation unit 25 may be equipped with a keyboard or a mouse. The control unit 21 performs a control corresponding to received manipulation data.

The short-range communication unit 26 is equipped with a circuit for short-range wireless communication and performs a short-range wireless communication with an external device. Examples of the short-range wireless communication employed by the short-range communication unit 26 are NFC (near-field communication), Bluetooth (registered trademark) communication, and communication in which authentication information is exchanged by radio or using a tag according to a piconet that is formed dynamically between terminals when plural Bluetooth devices come close to each other. In the embodiment, the short-range communication unit 26 is typically an NFC reader which performs an NFC communication according to the NFC standard as a short-range wireless communication.

Figure 3:
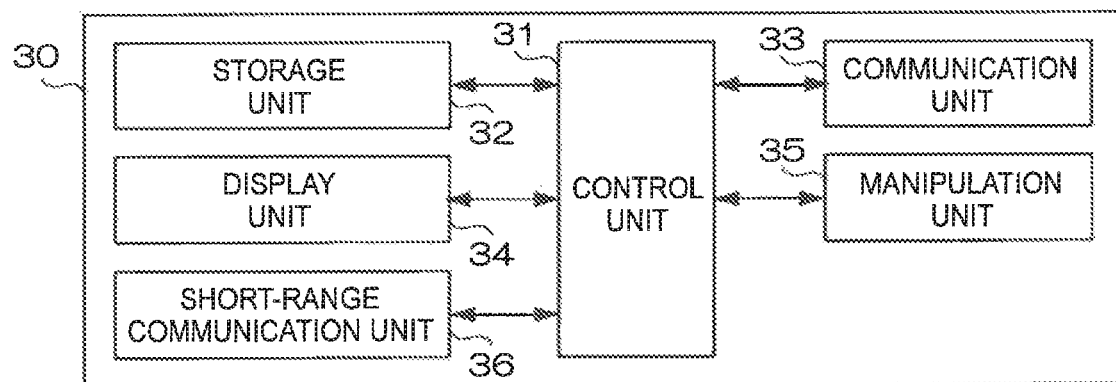
FIG. 3 shows a hardware configuration of an operation panel.

FIG. 3 shows a hardware configuration of the operation panel 30. The operation panel 30 is a computer that is equipped with a control unit 31, a storage unit 32, a communication unit 33, a display unit 34, a manipulation unit 35, and a short-range communication unit 36. The units other than the communication unit 33 are hardware units that are similar to the respective same-name units of each user terminal 20 shown in FIG. 2. The communication unit 33 is configured so as to be connected to the information processing apparatus 10 by a dedicated data bus and to communicate with it according to the TCP/IP protocol. Alternatively, the communication unit 33 may be configured so as to be equipped with a communication circuit for performing a communication according to a wired LAN standard and a port for insertion of a connector of a communication cable (more specifically, LAN cable) and to be connected to the information processing apparatus 10 using them. As a further alternative, the communication unit 33 may be such as to perform a wireless communication rather than a wired communication. For example, where as mentioned above the operation panel 30 is detachable, the communication unit 33 performs a wireless communication with the information processing apparatus 10.

Figure 4:
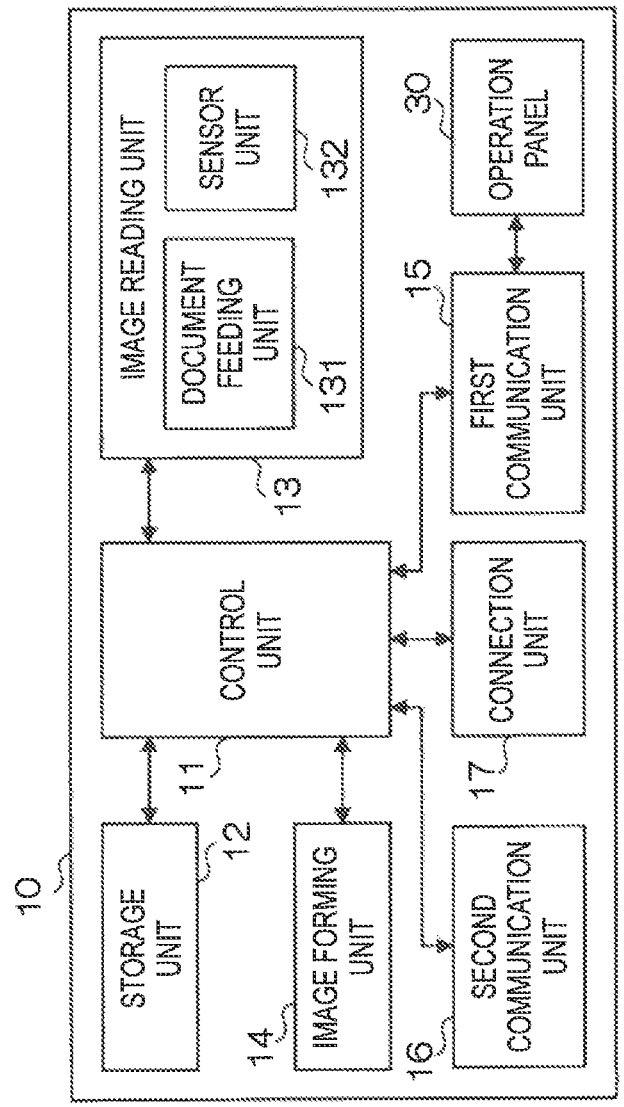
FIG. 4 shows a hardware configuration of an information processing apparatus.

FIG. 4 shows a hardware configuration of the information processing apparatus 10. The information processing apparatus 10 is a computer that is equipped with a control unit 11, a storage unit 12, an image reading unit 13, an image forming unit 14, a first communication unit 15, a second communication unit 16, and a connection unit 17, as well as the above-described operation panel 30 which functions as a UI (user interface) unit. In the embodiment, the control unit 11 controls the individual units other than the operation panel 30. The control unit 11 is a hardware unit that is similar to the control unit 21 of each user terminal 20 shown in FIG. 1. The storage unit 12 is equipped with a hard disk drive, for example, and stores data, programs, image data, etc. to be used by the control unit 11 to perform controls.

The image reading unit 13 performs image reading processing of optically reading an image that is drawn on a medium such as a sheet of a document using a CCD (charge-coupled device), for example. The image reading unit 13 is an example of the "reading device". The image reading unit 13 sends image data representing the read-out image to the control unit 11. The image reading unit 13 is equipped with a document feeding unit 131 and a sensor unit 132. When document sheets from which the image reading unit 13 is to read images are set, the document feeding unit 131 takes in each document sheet and feeds it to an image reading position. The sensor unit 132 detects a value indicating that a document sheet has been set in the document feeding unit 131. For example, the sensor unit 132 illuminates a document setting position of the document feeding unit 131 with infrared light and measures a light quantity of resulting reflection light. A reflection light quantity that is larger than a threshold value means setting of a document sheet.

The image forming unit 14 performs image forming processing of forming an image on a medium by an electrophotographic method, for example. The image forming unit 14 forms, on a medium such as a sheet, an image represented by image data that is supplied from the control unit 11. The above-described methods of image reading and image formation are just examples and other methods may be employed.

The first communication unit 15 is connected to the communication unit 33 of the operation panel 30 by a communication cable or a data bus, and communicates with the operation panel 30 without intervention of any external device. Likewise, the communication unit 33 of the operation panel 30 communicates with the information processing apparatus 10 without intervention of any external device. Where as mentioned above the communication unit 33 performs a wireless communication, the first communication unit 15 also performs a wireless communication. Configured as described above with reference to FIG. 3, the operation panel 30 communicates with the first communication unit 15.

The second communication unit 16 is equipped with, as communication interfaces, a communication circuit for performing a communication according to a wired LAN or wireless LAN standard, a port for insertion of a connector of a communication cable (LAN cable), and a wireless transmitting/receiving device that is compatible with a wireless LAN standard. The second communication unit 16 performs communication processing of communicating with a device that is connected via one of these interfaces. The second communication unit 16 is connected to the communication lines 2 shown in FIG. 1 and communicates with, for example, a user terminal 20 via an external device (an external device for the information processing apparatus 10; e.g., the communication device 3).

The connection unit 17 is equipped with slots etc. for connection to storage media such as an SD memory card and thereby connected to such storage media. Via the connection unit 17, the control unit 11 reads data stored in a storage medium connected to the connection unit 17 or writes data to a storage medium connected to the connection unit 17.

Figure 5:
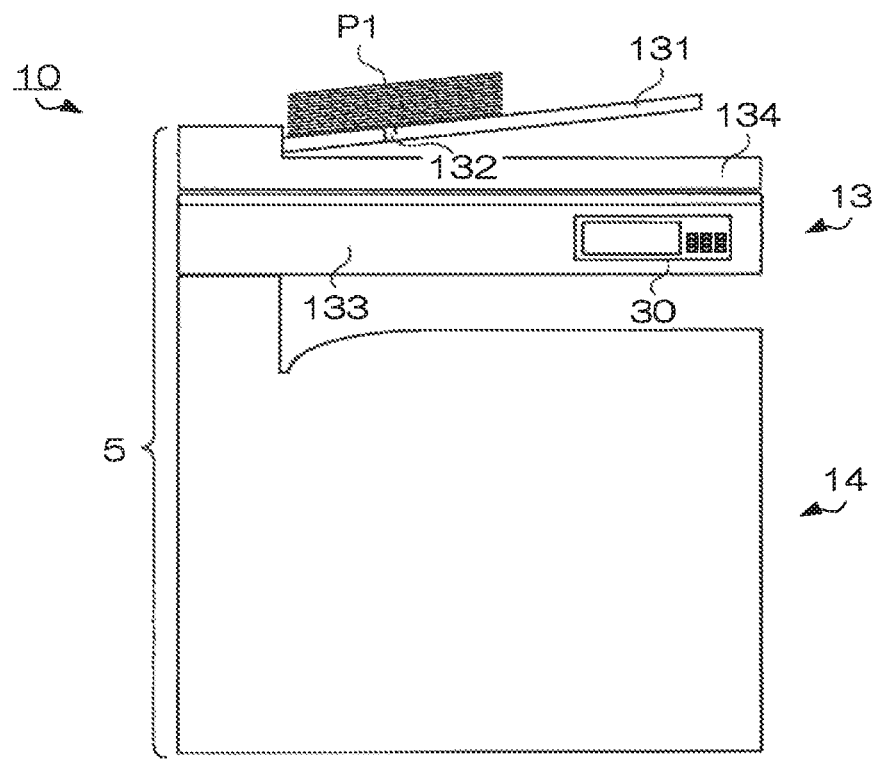
FIG. 5 shows an appearance of the information processing apparatus.

FIG. 5 shows an appearance of the information processing apparatus 10. The information processing apparatus 10 has a body 5, and the image reading unit 13 and the image forming unit 14 are disposed in a top portion and a bottom portion of the body 5, respectively. The image reading unit 13 is equipped with the above-described document feeding unit 131 and the sensor unit 132, a main body 133, and a document pressing unit 134. The main body 133 is equipped with a light source for illuminating a document with light, an image sensor, an optical system for guiding light reflected from the document to the image sensor, and other components. The document pressing unit 134 is a plate-shaped member for pressing a document that is placed on the main body 133 and is also called a platen cover.

The image reading unit 13 reads a document that is sandwiched between the main body 133 and the document pressing unit 134 and is located at the reading position. The document feeding unit 131 feeds a document set therein to the reading position. The operation panel 30 shown in FIG. 4 is disposed in the same portion of the body 5 as the main body 133 is. The operation panel 30 is used not only for manipulation of the image reading unit 13 but also for manipulation of various other units, such as the image forming unit 14, of the information processing apparatus 10.

Functions described below are realized as the control units of the information processing apparatus 10, a user terminal 20, and the operation panel 30 run programs and thereby control the individual units.

Figure 6:
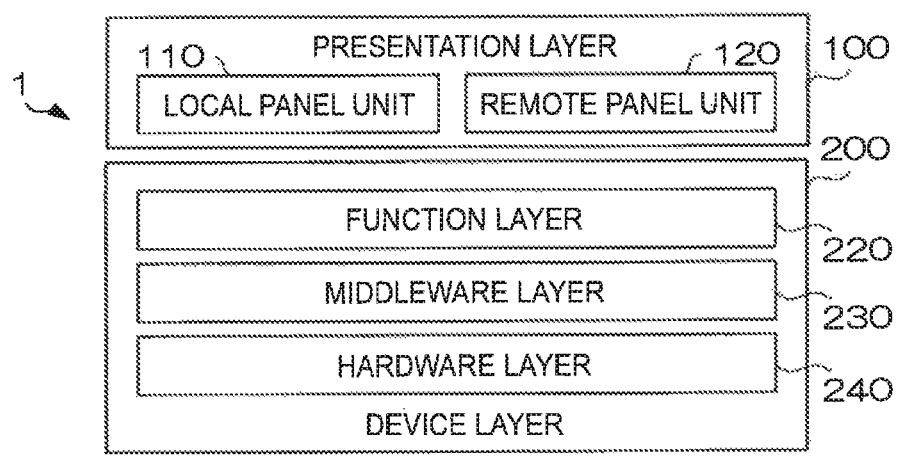
FIG. 6 shows a layered structure of functions of the information processing system.

FIG. 6 shows a layered structure of the functions of the information processing system 1. The information processing system 1 has a presentation layer 100 and a device layer 200. The presentation layer 100 is a layer for realizing a function (user interfacing) of receiving a user manipulation. The device layer 200 is a layer for performing processing according to a user manipulation received by the presentation layer 100 and thereby realizing the above-mentioned various functions such as copying and scanning.

The presentation layer 100 has a local panel unit 110 and a remote panel unit 120. The local panel unit 110 is a panel for manipulation that is provided in the information processing apparatus 10 and is to be used by a user who has come to the installation place of the information processing apparatus 10 (i.e., local place). The remote panel unit 120 is a panel for manipulation that is connected to the information processing apparatus 10 via the communication lines 2 and the communication device 3 shown in FIG. 1 and is to be used by a user who exists at a place that is distant from the information processing apparatus 10 (i.e., remote place).

The device layer 200 has a function layer 220, a middleware layer 230, and a hardware layer 240. The function layer 220 is a layer for realizing a function, such as a copying function and a scanning function, of processing data according to an intended use. The middleware layer 230 is a layer for performing general-purpose processing according to a user manipulation between the function layer 220 and the hardware layer 240. The hardware layer 240 is a layer for realizing such processing as image reading and image formation physically.

Figure 7:
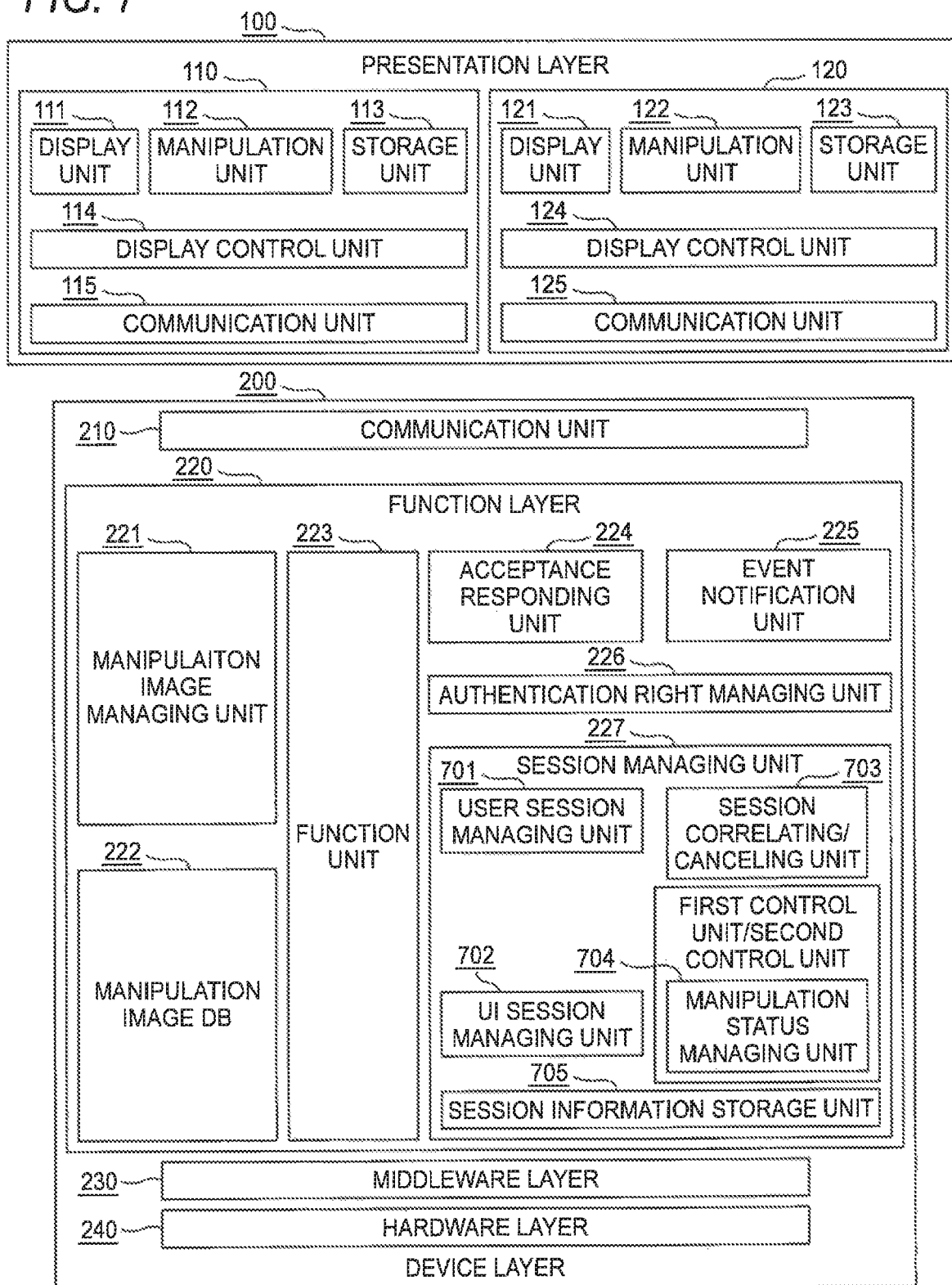
FIG. 7 shows the details of the functional configuration of the information processing system.

FIG. 7 shows the details of the functional configuration of the information processing system 1. The local panel unit 110 consists of a display unit 111, a manipulation unit 112, a storage unit 113, a display control unit 114, and a communication unit 115. The display unit 111 displays an image. The manipulation unit 112 receives a user manipulation. The storage unit 113 stores images to be displayed. The display control unit 114 controls the display unit 111 to display an image (hereinafter referred to as a "manipulation image") for manipulation of the information processing apparatus 10 or information representing a status of processing that is performed according to a manipulation made on the manipulation image. The communication unit 115 controls a communication that the display control unit 114 performs with the device layer 200.

The remote panel unit 120 consists of a display unit 121, a manipulation unit 122, a storage unit 123, a display control unit 124, and a communication unit 125, which are similar to the respective same-name units of the local panel unit 110.

The device layer 200 has a communication unit 210. The communication unit 210 mediates a communication between the self apparatus (information processing apparatus 10) and the presentation layer 100. The communication unit 210 mediates a communication according to the HTTP (hypertext transfer protocol; prescribed in RFC 7230, for example)/HTTPS (hypertext transfer protocol secure) standard. Furthermore, the communication unit 210 mediates a communication of, for example, data (hereinafter referred to as "XML data") that is written in XML (extensible markup language) according to the SOAP (simple object access protocol) standard. For example, the communication unit 210 receives XML data that is transmitted from the presentation layer 100 and indicates an HTTP request and supplies it to a manipulation image managing unit 221 (described later), and receives XML data that is transmitted from the manipulation image managing unit 221 in response to the former XML data and indicates an HTTP response and sends it to the presentation layer 100.

Furthermore, the communication unit 210 is compatible with the WebSocket standard (prescribed in RFC 6455, for example). According to this standard, once the presentation layer 100 is connected to it by a TCP (transmission control protocol) handshake procedure, the communication unit 210 mediates not only a communication of XML data indicating an HTTP request or an HTTP request but also, for example, a transmission of XML data from an event notification unit 225 to the presentation layer 100 that is made with optional timing. As a result, in the information processing system 1, not only a pull-type communication that is sent from the presentation layer 100 using an HTTP request but also a push-type communication that is sent from the information processing apparatus 10 is performed.

The function layer 220 consists of a manipulation image managing unit 221, a manipulation image DB (database) 222, a function unit 223, an acceptance responding unit 224, an event notification unit 225, an authentication right managing unit 226, and a session managing unit 227. The manipulation image managing unit 221 supplies a manipulation image as mentioned above (i.e., an image for manipulation of the information processing apparatus 10) to a manipulation terminal 4 via the communication unit 210. The manipulation image DB 222 is stored with manipulation images (more specifically, image data representing manipulation images). When a manipulation image is requested from a manipulation terminal 4, the manipulation image managing unit 221 sends the requested manipulation image to the request source manipulation terminal 4 via the communication unit 210.

Figure 8:
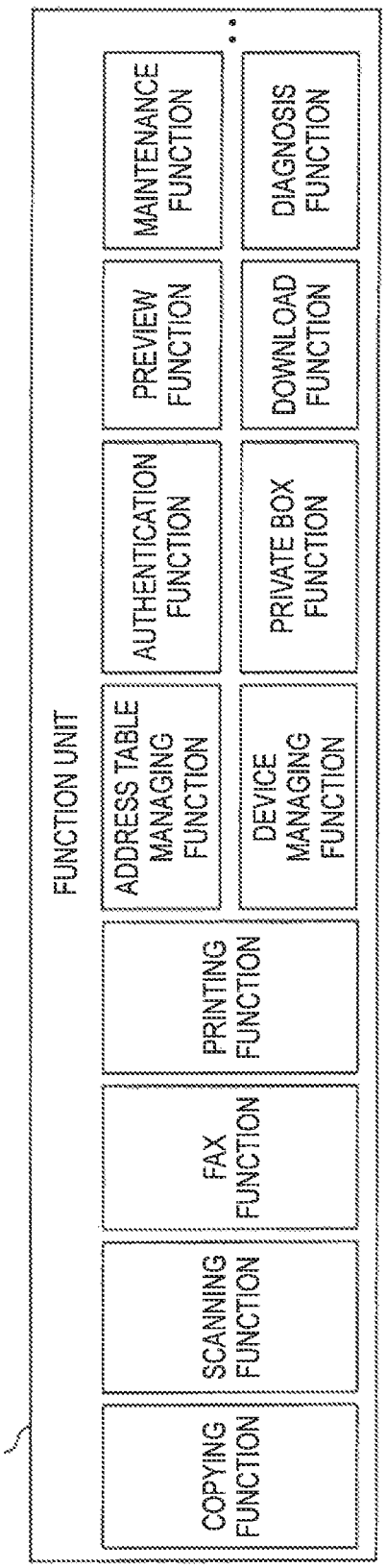
FIG. 8 shows an example group of modules included in a function unit.

The function unit 223 is a module group for implementing functions that the information processing apparatus 10 provides for users. FIG. 8 shows an example group of modules included in the function unit 223. The function unit 223 includes respective modules for implementing a copying function, a scanning function, a fax function, a printing function, an address table managing function (i.e., a function of managing address information), a device managing function (i.e., a function of managing a document setting state of the image reading unit 13, states of a medium, expendables of the image forming unit 14, and other states), an authentication function, a private box function (i.e., a function of managing electronic documents stored in the information processing apparatus 10), a preview function, a download function (i.e., a function of controlling update of programs), a maintenance function (i.e., a function of maintaining hardware according to a request from a remote place), and a diagnosis function (a function of diagnosing hardware).

The function unit 223 performs scanning processing, fax transmission processing, and printing processing (i.e., pieces of processing for providing the scanning function, fax function, and printing function), etc. in addition to the above-described copying processing. The copying processing includes image reading processing that is performed by the image reading unit 13 and image formation processing that is performed by the image forming unit 14. The scanning processing includes image reading processing, and the fax transmission processing includes fax communication processing that is performed by the second communication unit 16. The printing processing includes communication processing that is performed by the first communication unit 15 and image formation processing.

Each of the scanning processing and the fax transmission processing also includes, according to data acquisition and output methods, data communication processing that uses the second communication unit 16, writing processing of writing data to the storage unit 12, reading processing of reading stored data from the storage unit 12, and other kinds of processing.

The function unit 223 is instructed by the middleware layer 230 to perform processing. In performing certain processing, the function unit 223 supplies the session managing unit 227 with information indicating a status of the processing being performed. The function unit 223 supplies an execution result of the processing to the event notification unit 225 via the middleware layer 230.

The acceptance responding unit 224 accepts a manipulation that is performed on the self apparatus using a manipulation terminal. More specifically, the acceptance responding unit 224 accepts a processing request from the presentation layer 100 that is implemented as a manipulation terminal and requests the function unit 223 to perform processing according to a kind of the accepted processing. The acceptance responding unit 224 sends response data indicating a response to the accepted request (e.g., data indicating the acceptance of the request and data indicating a status of the processing) to the presentation layer 100 via the communication unit 210.

The event notifying unit 225 notifies the presentation layer 100 of information indicating a processing status that is supplied, for example, from the function unit 223 via the middleware layer 230. The authentication right managing unit 226 manages authentication information that is used for user authentication. The authentication right managing unit 226 checks rights of a user when the user logs in or certain processing is performed, and authenticates the user who is going to manipulate or manipulating a unit (e.g., image reading unit 13 or image forming unit 14) of the self apparatus.

The session managing unit 227 manages connection of a manipulation terminal 4, a state of the manipulation terminal 4, and a state of related processing. The session managing unit 227 consists of a user session managing unit 701, a UI session managing unit 702, a session correlating/canceling unit 703, a manipulation status managing unit 704, and a session information storage unit 705.

The term "session" means a series of manipulations and communications that are performed from a connection to a disconnection of a manipulation terminal 4 to the information processing apparatus 10 or from a login to a logout of a user, and the session is used as a unit for managing such a series of manipulations and communications. The information processing apparatus 10 is manipulated using a manipulation terminal 4 that forms a session. A session includes a user session and a UI session. The session managing unit 227 holds user session information indicating the contents of a user session and UI session information indicating the contents of a UI session.

The user session information indicates a history of manipulations that a user has made for the self apparatus using a manipulation terminal 4, a state of processing whose execution was commanded by the user, and other things. For example, the history of manipulations indicates what pictures the user has browsed and what functions he or she has used. If the user has used the copying function, the history of manipulations indicates selected settings of setting items such as a sheet size, a sheet orientation, color/black-and white, image quality, sorting/non-sorting, etc. If the user has used the fax function, the history of manipulations indicates a fax transmission destination number etc. The state of processing indicates a state such as whether the processing is in progress, is completed, or was suspended halfway.

The UI session information is management information of communications with a manipulation terminal 4 that a user is manipulating. The communication management information includes information necessary for communication connection management such as an IP address and a type of a program (e.g., browser) being run by the manipulation terminal 4. The session information including the UI session information is a unit for managing communications corresponding to the manipulation terminal 4. The communications corresponding to the manipulation terminal 4 mean communications including at least one of communications whose transmission sources are the manipulation terminal 4 and communications whose transmission destinations are the manipulation terminal 4.

The user session managing unit 701 generates user session information for each user who logs in to the self apparatus (information processing apparatus 10) and updates the generated user session information. The user session information includes user identification information for identification of a user who has logged in. For example, the user identification information is a character string representing a user ID (identification) or a user name that was used when the user logged in.

Even in a state that no user has logged in to the self apparatus, if a manipulation terminal 4 is connected to the self apparatus and hence the self apparatus is manipulatable, the user session managing unit 701 issues an unauthenticated user ID indicating an unauthenticated user (i.e., user identification information for identification of an unauthenticated user), generates user session information that is correlated with the unauthenticated user ID, and manages it. The user session managing unit 701 issues an unauthenticated user ID and generates user session information when a manipulation terminal 4 has been rendered in a state that it can communicate with (i.e., has been connected to) the information processing apparatus 10.

The user session managing unit 701 manages this user session information that is correlated with the unauthenticated user ID until a session termination condition is satisfied. For example, the termination condition is satisfied when a user logs in, a user make a manipulation commanding the end of use of the manipulation terminal 4 (e.g., a push of a reset button), or a period without any manipulation has reached a predetermined time (what is called a timeout). If the termination condition is satisfied by a login of the user, the user session managing unit 701 generates user session information including a user ID of the user. If the session termination condition is satisfied in another way, the user session managing unit 701 issues a next unauthenticated user ID and generates new user session information.

The UI session managing unit 702 generates UI session information for each manipulation terminal 4 to receive manipulations and manages it by storing it in the session information storage unit 705. Each piece of UI session information includes terminal identification information for identification of a manipulation terminal 4. In the embodiment, identification information assigned to each manipulation terminal 4 and its IP (Internet protocol) address are used as the terminal identification information.

The session correlating/canceling unit 703 correlates user session information and UI session information with each other. The session correlating/canceling unit 703 stores, in the session information storage unit 705, user session information generated by the user session managing unit 701 and UI session information generated by the UI session managing unit 702 in such a manner that they are correlated with each other. Session information corresponding to a state of each session is stored in the session information storage unit 705.

The manipulation status managing unit 704 generates manipulation status information indicating a status of a manipulation accepted by the acceptance responding unit 224, that is, a manipulation made by a user through a manipulation terminal 4 and updates the manipulation status information every time the user makes a new manipulation. When generating or updating manipulation status information, the manipulation status managing unit 704 supplies the generated or updated manipulation status information to the user session managing unit 701. The user session managing unit 701 generates or updates user session information by correlating the supplied manipulation status information with user identification information (or unauthenticated user ID).

The manipulation status managing unit 704 controls through which input device a manipulation relating to image reading by the image reading unit 13 shown in FIG. 4 should be made. The term "input device" as used herein means a device through which a user manipulation is input, that is, in the embodiment, a manipulation terminal 4. The image reading unit 13 is manipulated by an input device, that is, the operation panel 30 which is the manipulation terminal 4 disposed in the same body (the body 5 shown in FIG. 5) as the image reading unit 13 is or any of the user terminals 20 which are the other manipulation terminals 4.

The manipulation status managing unit 704 performs the above-described control by giving a right to use the image reading unit 13 to a manipulation terminal 4 through which to input an image reading manipulation. In the following description, the term "use right" will mean a right to use the image reading unit 13 unless otherwise specified. The manipulation status managing unit 704 switches the manipulation terminal 4 that is given a use right by, for example, storing terminal identification information of a manipulation terminal 4 that has been given a use right and overwriting it with terminal identification information of a manipulation terminal 4 to be given a use right next.

In the embodiment, in performing processing on the basis of an image reading manipulation, the middleware layer 230 refers to the terminal identification information stored in the manipulation status managing unit 704. The middleware layer 230 performs the processing if the manipulation is one made through the manipulation terminal 4 that is identified by the stored terminal identification information. The middleware layer 230 does not perform the processing if the manipulation is one made through another manipulation terminal 4. A use right is assigned to a manipulation terminal 4 in this manner.

When a document is set in the image reading unit 13, the manipulation status managing unit 704 controls the image reading unit 13 so that an image reading manipulation for the image reading unit 13 is made through a first input device. The first input terminal is a manipulation terminal 4 that is given a use right by the manipulation status managing unit 704 when a document is set in the image reading unit 13. In the embodiment, when a document is set in the image reading unit 13, the manipulation status managing unit 704 gives a use right to the operation panel 30 which is the manipulation terminal 4 disposed in the body 5 shown in FIG. 5 and is regarded as the first input device.

Assume a case that no document is set in the image reading unit 13 and a use right of the image reading unit 13 is given to a user who has logged in to the information processing apparatus 10 using a user terminal 20. If in this state another user sets a document in the image reading unit 13, the manipulation status managing unit 704 judges that the document has been set on the basis of a detection result of the sensor unit 132 shown in FIG. 4 and switches the manipulation terminal 4 that is given a use right from the user terminal 20 to the operation panel 30. In the following description, this control for giving a use right to the first input device when a document is set in the image reading unit 13 will be referred to as a "first control." The manipulation status managing unit 704 is an example of the "first control unit".

If a particular manipulation is made after a start of a first control described above, the manipulation status managing unit 704 controls the image reading unit 13 so that an image reading manipulation can be made through a second input device. The second input terminal is a manipulation terminal 4 to which a use right is transferred from the first input device. For example, where the first input device is the operation panel 30 which is disposed in the same body (the body 5 shown in FIG. 5) as the image reading unit 13 is, the particular manipulation is a manipulation for causing a short-range wireless communication between the operation panel 30 and another manipulation terminal 4 (e.g., user terminal 20).

For example, where the operation panel 30 and each user terminal 20 are equipped with the short-range communication unit 36 and the short-range communication unit 26 as NFC reader/writers, respectively, an NFC communication is performed by bringing the NFC reader/writers of the operation panel 30 and a user terminal 20 into a close range of a prescribed distance as a manipulation for causing such a short-range wireless communication. Information for identification of the terminal as the second input device is sent to the information processing apparatus 10 by this communication.

When a particular manipulation has been made, the manipulation status managing unit 704 transfers the use right that has been assigned to the operation panel 30 to the manipulation terminal 4 (second input device) that was involved in the short-range wireless communication. As a result of the transfer, the operation panel 30 (first input device) is no longer assigned a use right. In the following description, a control for transferring a use right from a first input device to a second input device as a result of carrying-out of a particular manipulation will be referred to as a "second control." The manipulation status managing unit 704 is also an example of the "second control unit".

The operation panel 30 supplies, to the manipulation status managing unit 704, via the communication unit 210, terminal identification information received from a user terminal 20 together with information to the effect that a short-range wireless communication has been made with the manipulation terminal 4 that is identified by the received terminal identification information. When supplied with these pieces of information, the manipulation status managing unit 704 judges that a particular manipulation as mentioned above has been made and overwrites the stored terminal identification information with the received terminal identification information. As a result, the use right is transferred from the operation panel 30 to the user terminal 20. In this case, a user who exists so close to the image reading unit 13 as to be able to make a manipulation for causing a short-range wireless communication with the operation panel 30 is allowed to make a manipulation for image reading.

The manipulation status managing unit 704 finishes, in the following manner, the above control that has been performed on the image reading unit 13 (i.e., the control for assigning a use right to the manipulation terminal 4). For example, when a use right has been transferred by a manipulation for causing a short-range wireless communication as mentioned above, the manipulation status managing unit 704 finishes the control of the image reading unit 13 upon a termination of the short-range wireless communication.

The termination of the short-range wireless communication means that the user who is manipulating the second input device (in this example, user terminal 20) has left the first input device (in this example, operation panel 30) and also means that he or she has left the image reading unit 13 which is disposed in the same body as the operation panel 30 is. Finishing the control of the image reading unit 13 upon occurrence of this event allows another user to make a manipulation for image reading after the current user has left the image reading unit 13.

For example, the manipulation status managing unit 704 finishes the control of the image reading unit 13 by deleting the stored terminal identification information. Once the terminal identification information is deleted, the middleware layer 230 cannot find any terminal identification information to be referred to that should be stored in the manipulation status managing unit 704 in performing processing that is based on a manipulation for image reading. In this case, the middleware layer 230 performs processing that is based on a current manipulation whichever manipulation terminal 4 the manipulation was made through. The control of the image reading unit 13 by the manipulation status managing unit 704 is finished in the above manner, whereby the use right that has been assigned to the manipulation terminal 4 is freed.

A use right is also freed in the following cases. For example, the manipulation status managing unit 704 frees a use right when image reading from a document that is set in the image reading unit 13 has been completed. The manipulation status managing unit 704 may free a use right when such image reading has been completed if it is indicated that there is no further document (the use right is not freed if it is indicated that a further document exists). The manipulation status managing unit 704 frees a use right when all of users who have logged in as users authorized to manipulate the image reading unit 13 have logged out.

In these cases, it is unknown until setting of a next document whether there is a user who is going to make a manipulation for image reading. Freeing a use right in the above manners prevents, in these cases, a situation that other users cannot make a manipulation for image reading.

Figure 9:
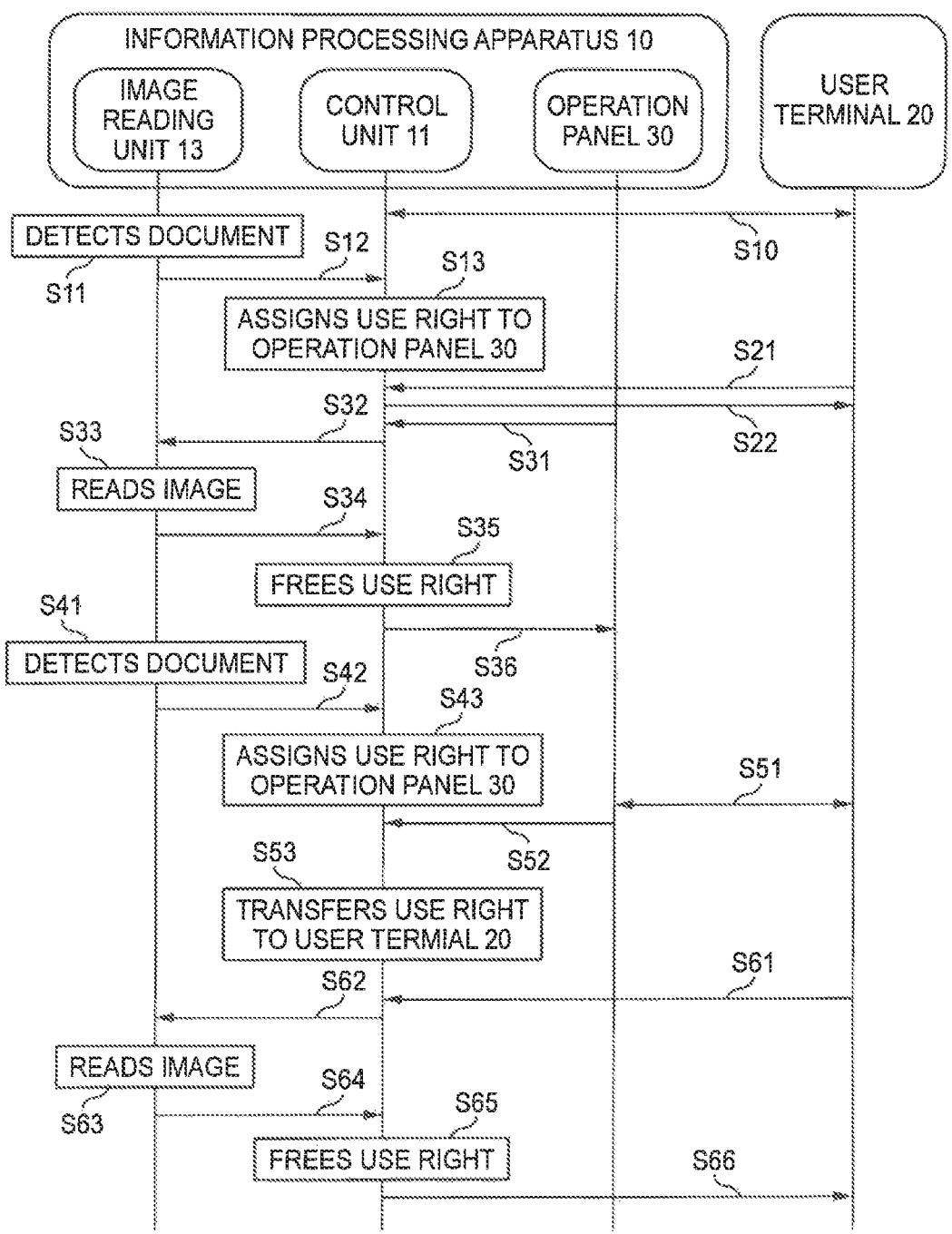
FIG. 9 shows an example operation procedure of the information processing apparatus.

An operation that the information processing apparatus 10 assigns and transfers a use right of the image reading unit 13 will be described below. FIG. 9 shows an example operation procedure of the information processing apparatus 10. In the example of FIG. 9, the control unit 11, the image reading unit 13, and the operation panel 30 of the information processing apparatus 10 and the a user terminal 20 are considered main units that perform the operation.

The operation of FIG. 9 is started being triggered by a manipulation that user A logs in to the information processing apparatus 10 using the user terminal 20. First, at step S10, the control unit 11 and the user terminal 20 communicate with each other and the control unit 11 generates session information of user A who has logged in.

When user B sets a document in the image reading unit 13, the image reading unit 13 detects the thus-set document at step S11 and supplies a detection result to the control unit 11 at step S12. Upon receiving the detection result, at step S13 the control unit 11 (manipulation status managing unit 704) performs a control for assigning a use right to the operation panel 30. Assume that user A then manipulates the user terminal 20 to start image reading. At step S21, the user terminal 20 requests the control unit 11 to start image reading. However, since the user terminal 20 is not a manipulation terminal 4 that is assigned a use right, at step S22 the control unit 11 notifies the user terminal 20 that the manipulation is not accepted.

Assume that user B then manipulates the operation panel 30 to start image reading. At step S31, the operation panel 30 requests the control unit 11 to start image reading. Since the operation panel 30 is a manipulation terminal 4 that is assigned a use right, at step S32 the control unit 11 accepts the request and instructs the image reading unit 13 to start image reading. Upon receiving this instruction, at step S33 the image reading unit 13 starts feeding the document that is set therein and reads an image from the document. Upon completion of the image reading, at step S34 the image reading unit 13 sends a notice to that effect to the control unit 11. Since the image reading has completed, at step S35 the control unit 11 frees the use right that has been assigned to the operation panel 30. At step S36, the control unit 11 notifies the operation panel 30 that the image reading has completed.

Assume that user A then comes to the installation place of the information processing apparatus 10 and sets a document in the image reading unit 13. The image reading unit 13 detects the thus-set document at step S41 and supplies a detection result to the control unit 11 at step S42. Upon receiving the detection result, at step S43 the control unit 11 (manipulation status managing unit 704) performs a control for assigning a use right to the operation panel 30. Assume that user A then makes a manipulation of placing the user terminal 20 close to the operation panel 30. In response to this manipulation, at step S51 the operation panel 30 performs a short-range wireless communication with the user terminal 20. In response, at step S52, the operation panel 30 notifies the control unit 11 that it has performed a short-range wireless communication with the user terminal 20. Upon receiving this notice, at step S53 the control unit 11 (manipulation status managing unit 704) performs a control for transferring the use right from the operation panel 30 to the user terminal 20.

Assume that user A then manipulates the user terminal 20 to start image reading. At step S61, the user terminal 20 requests the control unit 11 to start image reading. Since the user terminal 20 is a manipulation terminal 4 to which the use right has been transferred, at step S62 the control unit 11 accepts the request and instructs the image reading unit 13 to start image reading. Upon receiving this instruction, at step S63 the image reading unit 13 starts feeding the document that is set therein and reads an image from the document. Upon completion of the image reading, at step S64 the image reading unit 13 sends a notice to that effect to the control unit 11. Since the image reading has completed, at step S65 the control unit 11 frees the use right that has been assigned to the user terminal 20. At step S66, the control unit 11 notifies the user terminal 20 that the image reading has completed.

In the embodiment, controls for assigning a use right is performed in the above-described manner, whereby input devices through which an image reading manipulation for the image reading unit 13 can be made are restricted. For example, a use right is assigned to the operation panel 30 when a document is set. Therefore, a user who comes to the installation place of the image reading unit 13 which is disposed in the same body as the operation panel 30 is can make manipulations for image reading. While this user is making manipulations for image reading, no other users can make such manipulations.

In the embodiment, even during image reading, the input device through which a manipulation for image reading can be made can be switched by making a particular manipulation as mentioned above (e.g., a login manipulation or a manipulation for causing a short-range wireless communication). In other words, while an input device is being used through which an image reading manipulation for the image reading device can be made, the image reading manipulation right can be switched to another input device through which a manipulation for image reading is desired to be made.

[Modifications]

The above-described embodiment is just an example of the invention and may be modified in the following manners. And the above-described embodiment may be combined with each of the following modifications as appropriate.

[2-1] First Control

The manipulation status managing unit 704 may perform a first control by a different method than in the embodiment. For example, if there exists a user who has logged in using the operation panel 30 when a document is set in the image reading unit 13, the manipulation status managing unit 704 performs a control for assigning a use right to the operation panel 30 (first input device). If there exists no such user, the manipulation status managing unit 704 may abstain from assigning a use right to the operation panel 30.

The manipulation status managing unit 704 may assign use rights to plural manipulation terminals 4. For example, when a user has logged in to the information processing apparatus 10 using plural respective manipulation terminals 4 including the operation panel 30, the manipulation status managing unit 704 assigns use rights to those manipulation terminals 4 when a document is set in the image reading unit 13. As a result, the user can make manipulations for image reading using any of these manipulation terminals 4.

In this case, the manipulation status managing unit 704 may free the use right of a manipulation terminal 4 through which the user has made a logout manipulation. If the plural manipulation terminals 4 through which the user has logged in do not include the operation panel 30, the manipulation status managing unit 704 may abstain from assigning use rights to those manipulation terminals 4. In this manner, the manipulation status managing unit 704 may assign use rights to various manipulation terminal 4 as long as the assignment is triggered by setting of a document in the image reading unit 13.

[2-2] Particular Manipulation

The particular manipulation is not limited to the one described in the embodiment. In the embodiment, the particular manipulation is a manipulation for causing a short-range wireless communication between the operation panel 30 and a user terminal 20. For example, where the image reading unit 13 has a short-range wireless communication function, the particular manipulation may be a manipulation for causing a short-range wireless communication between the image reading unit 13 and a user terminal 20. In this case, a user who exists so close to the image reading unit 13 as to be able to make a manipulation for causing a short-range wireless communication with the image reading unit 13 is allowed to make a manipulation for image reading.

Figure 10:
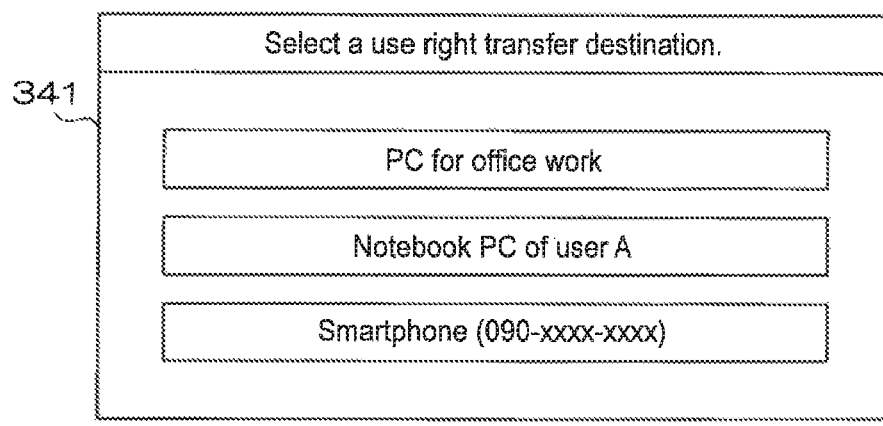
FIG. 10 shows an example picture for a use right transfer manipulation.

The particular manipulation may also be a manipulation of selecting a manipulation terminal 4 to which a use right should be transferred through the operation panel 30 (first input device). FIG. 10 shows an example picture for a use right transfer manipulation. In the example of FIG. 10, displayed on a display screen 341 of the display unit 34 of the operation panel 30 are a character string "Select a use right transfer destination" and manipulation items for selection of one of manipulation terminals 4, "PC for office work," "Notebook PC of user A," and Smartphone (090-xxxx-xxxx)." When a user makes a manipulation of selecting one of these manipulation items, the manipulation status managing unit 704 performs a control for transferring a use right to the selected manipulation terminal 4.

Another example of the particular manipulation is a transfer-requesting manipulation that is made through a manipulation terminal 4 to which a user wants to have a use right be transferred. In this case, for example, the manipulation status managing unit 704 may accept, as a particular manipulation, only a transfer-requesting manipulation that is made through a manipulation terminal 4 through which a user has logged in who has also logged in using the first input device and then perform a control for transferring the use right to that manipulation terminal 4.

A further example of the particular manipulation is manipulations of causing a manipulation terminal 4 serving as the first input device to display a temporary password (i.e., a password that has a short period of validity and will expire upon passage of it) and inputting the temporary password through another manipulation terminal 4. In summary, the particular manipulation may be any manipulation that can be made by a user who is using a manipulation terminal 4 whose use right may be transferred and that causes information for identification of a transfer destination manipulation terminal 4 to be transmitted to the information processing apparatus 10.

[2-3] Approval of Transfer

Whereas in the embodiment a use right is transferred necessarily when a particular manipulation is made, a modification is possible in which transfer of a use right requires approval of a user who is using the operation panel 30 or a user terminal 20. In this case, the manipulation status managing unit 704 performs a control for transferring a use right to a second input device when a particular manipulation is made and then approved by a user who is using the operation panel 30 as the first input device or a user terminal 20 as the second input device. For example, an approval manipulation is performed in the following manner.

Figure 11:
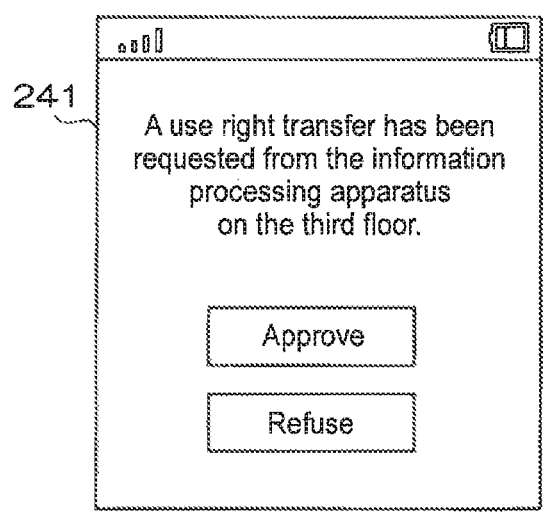
FIG. 11 shows an example picture for a manipulation of approving a use right transfer.

FIG. 11 shows an example picture for a manipulation of approving a use right transfer. In the example of FIG. 11, a character string "A use right transfer has been requested from the information processing apparatus on the third floor" and manipulation items for selection between approval and refusal are displayed on a display screen 241 of the display unit 24 of a use right transfer destination user terminal 20 (in this example, second input device). If the user selects the manipulation item "Approve," the use right transfer is approved and the manipulation status managing unit 704 performs a control for transferring the use right to the user terminal 20. A manipulation for approving the use right transfer may be made through the operation panel 30 which is the use right transfer source. With this measure, if a user does not want a transfer, a state that image reading manipulations are made through the first input device is maintained even if a particular manipulation is made.

[2-4] Restriction of Transfer Destinations

The manipulation status managing unit 704 may restrict use right transfer destinations. In the embodiment, there may occur a case that the manipulation status managing unit 704 assigns a use right to a manipulation terminal 4 (e.g., operation panel 30) that was not used by a user for login, when a document is set in the image reading unit 13. For example, a manipulation terminal 4 through which a user logged in to the information processing apparatus 10 may be made the only manipulation terminal 4 to which a use right can be transferred.

In this case, when a particular manipulation is made, the manipulation status managing unit 704 performs a control for assigning a use right to a manipulation terminal 4 (second input device) through which the user logged in to the information processing apparatus 10 as a user who is authorized to manipulate the image reading unit 13. This prevents occurrence of a situation that users who have not logged in continue to use the image reading unit 13 to cause a user who has logged in to wait.

In the embodiment, there may occur a case that the manipulation status managing unit 704 assigns a use right to a manipulation terminal 4 through which a user logged in, when a document is set in the image reading unit 13. In this case, when a particular manipulation is made, the manipulation status managing unit 704 may perform a control for assigning a use right to a manipulation terminal 4 (second input device) through which a user logged in who is different from the user who logged in to the information processing apparatus 10 using the manipulation terminal 4 that is the first input device. This prevents occurrence of a situation that the same user continues to use the image reading unit 13.

[2-5] Freeing of Use Right

The manipulation status managing unit 704 may free a use right in different cases than in the embodiment. For example, the manipulation status managing unit 704 may free a use right upon a lapse of a predetermined time from its assignment or upon a transition of the self apparatus to a power saving mode.

[2-6] Input Device

The input devices to which a use right can be assigned are not restricted to the manipulation terminals 4. For example, if different users have logged in using the same manipulation terminal 4, a browser picture that represents a virtual input device appears for each of those users. The manipulation status managing unit 704 may assign a use right to an input device represented by such a browser picture. In this case, whereas an image reading manipulation can be made through a browser picture to which a use right is assigned, no image reading manipulation can be made through a browser picture to which a use right is not assigned.

[2-7] Functional Structures for Implementing Individual Units

Although in the above-described embodiment and modifications the manipulation status managing unit 704 is examples of the first input unit and the second input unit, the invention is not limited that case. For example, the whole of the session managing unit 227 may function as the first input unit and the second input unit. As a further alternative, the first input unit and the second input unit may be provided separately from the units shown in FIG. 7.

[2-8] Categories of the Invention

The invention can be recognized not only as an information processing apparatus as described above but also as a manipulation terminal such as an operation panel or a user terminal and an information processing system consisting of those apparatus and devices. The invention can also be recognized as an information processing method for realizing processing that is performed by such an apparatus and terminal as well as a program for causing a computer like such an apparatus or terminal to function as (part of) the above-described units. For example, such a program may be provided either in the form of a recording medium such as an optical disc that is stored with it or in such a form as to be downloaded to a computer over a communication line such as the Internet and installed therein for use.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing apparatus comprising:
    an operation panel that displays a menu for operating the information processing apparatus and that comprises a short range communication unit configured to perform short-range wireless communication with one of a plurality of external devices;
    a controller that controls to accept a plurality of accesses to the information processing apparatus from a plurality of users simultaneously, the plurality of accesses being performed via the operation panel and at least one of the external devices with which the short range communication unit performs the short-range wireless communication; and
    a CPU configured to assign a right to use the information processing apparatus selectively to (i) the operation panel for one of the plurality of users who operates the information processing apparatus directly and (ii) one of the external devices with which the short range communication unit is performing the short-range wireless communication.

2. The information processing apparatus according to claim 1,
    wherein the CPU is configured to transfer the right to use the information processing apparatus when assigned to the one external device from the one external device to the operation panel when the short-range wireless communication with the one external device is terminated.

3. The information processing apparatus according to claim 1,
    wherein the CPU is configured to transfer the right to use the information processing apparatus when assigned to the one external device from the one external device to the operation panel after a predetermined time has passed from when the right to use the information processing apparatus is assigned to the one external device.

4. An information processing apparatus comprising:
    an operation panel that displays a menu for operating the information processing apparatus and that comprises a short range communication unit configured to perform short-range wireless communication with one of a plurality of external devices;
    a controller that controls to accept a plurality of accesses to the information processing apparatus from a plurality of users simultaneously, the plurality of accesses being performed via the operation panel and at least one of the external devices with which the short range communication unit performs the short-range wireless communication; and
    a CPU configured, when a manipulation for approving a transfer of a right to use the information processing apparatus is made through the operation panel, to assign the right to use the information processing apparatus selectively to (i) the operation panel for one of the plurality of users who operates the information processing apparatus directly and (ii) one of the external devices with which the short range communication unit is performing the short-range wireless communication.

5. The information processing apparatus according to claim 4,
    wherein the CPU is configured to transfer the right to use the information processing apparatus when assigned to the one external device from the one external device to the operation panel when the short-range wireless communication with the one external device is terminated.

6. The information processing apparatus according to claim 4,
    wherein the CPU is configured to transfer the right to use the information processing apparatus when assigned to the one external device from the one external device to the operation panel after a predetermined time has passed from when the right to use the information processing apparatus is assigned to the one external device.

* * * * *